W. C. L. LEFELDT & C. G. O. LENTSCH.
CENTRIFUGAL CREAMER.
No. 292,661. Patented Jan. 29, 1884.
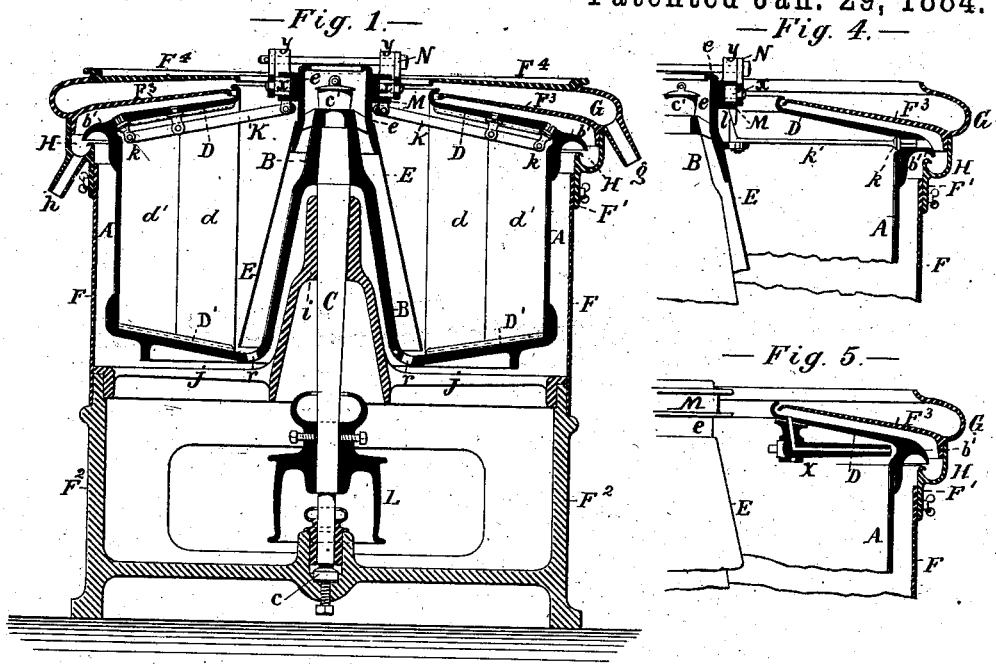
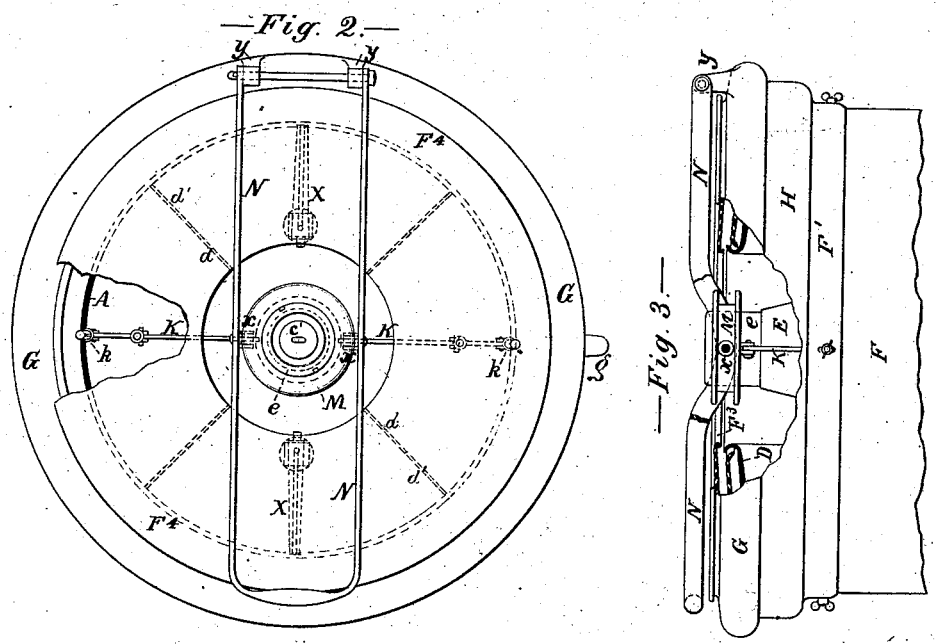
Witnesses:
Ludwig Wilburger
Ferdinand Philips
Inventors:
W. C. L. Lefeldt,
C. G. O. Lentsch,
By Theodore Bergner
Attorney.

United States Patent Office.

WILHELM C. L. LEFELDT AND CARL G. O. LENTSCH, OF SCHÖNINGEN, BRUNSWICK, GERMANY, ASSIGNORS TO THEODORE BERGNER, OF PHILADELPHIA, PENNSYLVANIA.

CENTRIFUGAL CREAMER.

SPECIFICATION forming part of Letters Patent No. 292,661, dated January 29, 1884.

Application filed July 28, 1879. Patented in France June 6, 1879, No. 131,357; in England December 24, 1879, No. 5,271, and in Germany April 6, 1880, No. 12,728.

*To all whom it may concern:*

Be it known that we, WILHELM C. L. LEFELDT and CARL G. O. LENTSCH, both of Schöningen, in the Duchy of Brunswick and Empire of Germany, have jointly invented certain new and useful Improvements in the Process of Creaming Milk by Centrifugal Force, and in Apparatus for the Conduct of such Process, of which improvements the following is a specification.

These improvements are substantially comprised in the British Letters Patent No. 5,271, dated December 24, 1879, taken out by us through our agent, Edwin Powley Alexander, of London; German Patent No. 12,728, dated April 6, 1880, and French Patent No. 131,357, dated June 6, 1879.

In separate Letters Patent of the United States issued to us of even date herewith we have described a process and centrifugal apparatus for the conduct of such process, whereby milk is creamed mechanically, the cream skimmed off mechanically, the skimmed milk removed mechanically, and fresh milk supplied under a regulated feed, so as to drive off the cream and the skimmed milk separately while maintaining the incipient and progressive separation of the cream and the milk fed in, and thus rendering the process continuous. In that continuous process the feed-supply of fresh milk is regulated independently of the centrifugal machine, while the discharges of cream and skimmed milk are regulated with reference to the independent feed-supply by adjustments of the centrifugal apparatus, such adjustments being necessarily and only made while the machine is in a state of rest. This continuous system, while perfectly practicable and efficient, requires a closed revolving vessel or cylinder, in which the lateral or vertical openings for the escape of the skimmed milk from the cylinder are duly proportioned in number and aggregate area to the volume of the feed-supply, proper allowance being made for the fact that the independent feed-supply has only the impetus of the pressure from the reservoir, while the discharge from the cylinder has the greater impetus of centrifugal force, and as this force, while always greater than that under which the feed is supplied, varies with the variations in the speed of rotation of the cylinder, the discharge of the skimmed milk from the vessel after its escape from the cylinder requires further regulating by means of an adjustable valve or cock outside of the vessel, all of which is fully provided for in the specification of the separate patent above referred to.

We have found in practice that it is very desirable to conduct this continuous process in vessels open at the top, and otherwise of more simple and less costly construction than those described in our said patent, and also to have the discharge of skimmed milk susceptible of regulation while the drum is rapidly rotating; and to accomplish these ends is the object of our present improvements, by which we adapt the continuous process to use in a revolving drum surrounded by a stationary casing, substantially such as is described and shown in another application for Letters Patent of the United States, also filed by us in the Patent Office July 26, 1879. Such a machine affords desirable facilities for cleaning and dismounting, when necessary, and is better calculated for the use of the process on a smaller scale than would be compatible with economy in such machines as those described in our aforesaid separate patent; and to these ends our present invention consists in certain modifications both of the process and of the apparatus for the conduct thereof, which modifications are represented in the accompanying drawings, forming part of this specification, and in which—

Figure 1 is a sectional elevation through our improved apparatus, showing our novel method of regulating the discharges of the cream and of the skimmed milk while the drum is revolving. Fig. 2 is a plan or top view of the apparatus, a part of the cap-plate being broken away to show more clearly one of the regulating levers and valves. Fig. 3 is a side elevation of the upper portion of the apparatus, a part of the casing being broken away to show more clearly the arrangement of the hand-lever which operates the regulating-valves. Fig. 4 is a vertical section through the center and one side of the upper portion of the apparatus, showing a modification of the regulating lever and valve, and Fig. 5 is a vertical section through one side of the upper portion of the apparatus, showing a regulated discharging device which is susceptible of adjustment as and for the purposes hereinafter described.

The regulated feed-supply is, as already mentioned, entirely independent of the apparatus shown in the drawings; and it consists simply of a reservoir to hold the fresh milk and a pipe or conduit to conduct the fresh milk from the reservoir into the extension of the coned hood, this pipe or conduit being fitted with a cock or valve, by means of which the feed-supply is regulated.

The centrifugal apparatus consists of a stationary casing or jacket, F, of suitable metal, mounted upon a base, F², in the bed-plate of which is a step, c, for the lower end of the spindle C, which spindle is further supported in a bearing, i, secured to arms j, attached to the top of the base F². The driving-pulley L is fastened upon the shaft C above the step c, and a belt passing around this pulley is driven from any suitable motor. The shaft or spindle C projects through the bearing i, and has a lubricating-cup, c', on its upper end. Within the casing F is the revolving cylinder or drum A, made of suitable metal, and having straight sides, an inclined bottom, D', a coned center, B, and a top plate, D, in which is a central annular opening. The sides are solid—that is, unperforated. The bottom has openings r r at the base of the coned center, which openings may be closed by removable plugs, and the top plate has openings at its outer edge, next the wall of the drum, in which openings the regulating-valves k k are fitted. The top plate has also a curved lip, b', around its outer edge, and a reversed curve is given to its inner edge around the central annular opening. The coned center B of this drum is fitted upon and secured to the upper end of the spindle C, with which spindle the drum revolves. Vertical partitions d d' extend from the bottom to the top of the drum, and from the wall to the line of the central annular opening, each of these partitions being made in two pieces to facilitate their removal when desired, which is effected by sliding them in grooves provided in the bottom and top plate of the drum, and which also hold them in place. Underneath the top plate and around the wall of the drum a slight concavity is formed, so as to afford an enlarged diameter at this point, and thereby promote the discharge of the skimmed milk. Around the coned center B of the drum the coned hood E is fitted upon radial arms resting upon the spindle C, so as to support the hood. A cylindrical extension, e, of this hood is carried up through the central opening in the top plate of the drum slightly above the cap-plate of the casing, and thus, while still leaving an annular space outside of and around the extension e, we provide through the hood and around the coned center of the drum an annular conduit extending down to near the bottom of the drum, and into and through this conduit the fresh milk is supplied from the regulated feed and conducted to the lower end of the coned hood E, beneath which it escapes into the drum under the action of the centrifugal force.

Upon the cylindrical extension e of the coned hood E we fit a grooved collar, M, which is splined so as to turn with the spindle C, yet slides vertically up and down upon it far enough to operate the regulating-valves. These valves k k are fitted in the openings in the top plate near the wall of the drum, and are operated by the levers K K, one end of each lever being attached to its valve, while its opposite end is pin-jointed in lugs depending from the grooved collar M, while a fulcrum is provided in an intermediate lug depending from the top plate D.

On the top of the casing F we fit a ring, F', and in the upper part of this ring we form the overhanging annular trough H, into which the skimmed milk escapes, and from which it is led off through the pipe h to the receptacle. The curved lip around the outer edge of the drum A overhangs the edge of this trough, so as to better conduct the milk to the trough. Above this trough again we fit the top F³ of the casing, this top having a central opening which fits around the outwardly-curved edge of the opening in the center of the top plate D of the drum. Around the upper surface of this plate F³ we form the annular trough or channel G, into which the cream escapes, and from which it is led off by the pipe g into the receptacle; and, lastly, we close the top of the casing with a cap-plate, F⁴, which is supported upon the edge of the channel G in the top plate F³, leaving now a central annular opening through the casing and a space between the bottom of the cap-plate and the top of the drum, through which the cream is thrown out into the trough G. The forked hand-lever N is now pin-jointed through one end in the lugs y y upon the edge of the top plate F³, and rollers x x, projecting inwardly from this forked lever, take into the grooved collar M, so that the operator, by moving the free end of the forked lever up or down, will raise or lower the grooved collar, and with it the inner end of the levers K K, thereby opening or closing the valves k k, the rollers and the grooved collar permitting this to be done while the drum is rotating at whatever velocity.

The operation of this apparatus is as follows: The drum A, having been put in rapid rotation, the feed-supply is turned on from the reservoir under due regulation, and the fresh milk enters the extension e of the coned hood E and passes down through the annular space between the coned hood and the coned center B of the drum, from which annular space it escapes underneath the coned hood into the drum, where it is rapidly separated and formed into distinct vertical belts of cream and blue milk, as is now well understood. When the belt of cream has been moved out toward the center of the drum by the augmentation of the charge from the feed-supply, the separation of the milk from the cream will have been so far completed that the cream will begin to fly out through the central annular opening and over the top plate of the drum into the trough G. The operator has now only to regulate the discharge of the skimmed milk, so as to maintain the discharge of the cream properly, and as he knows that the regulated feed-supply and the corresponding accretion to the charge is continuing while the cream is escaping, he knows that it is now necessary to open the valves $k\ k$, in order that there may be a commensurate escape from the belt of skimmed milk to prevent the volume of the charge from being so augmented as to force out the cream with undue rapidity, and even cause it to be followed by the escape of milk (not perfectly separated) through the central opening. To regulate the discharge of skimmed milk, the operator has simply to raise the free end of the hand-lever N, which will lift the grooved collar M by the rollers, and so open the valves, when the skimmed milk will escape through the openings under the impulse of the centrifugal motion of the drum. Should the velocity of the rotation be so great as to give the escape of skimmed milk undue force or rapidity with the valves wide open, the operator has simply to lower the free end of the hand-lever N, and thereby partially close the valves $k\ k$, and, on the other hand, should the speed of the drum be materially lessened, and the escape of skimmed milk consequently become too slow, the operator has only to raise the lever higher and open the valves wider, thereby compensating for the reduced speed. It is obvious that when the vessel is running at a uniform speed and the feed-supply is duly regulated, the free end of the hand-lever may be set at the proper height to conformably regulate the escape of skimmed milk, and the operator will then only have to observe from time to time that the cream escaping through the central opening is in proper condition, and indicates that the machine is working properly under the due regulation of the escape through the valves.

To adjust the lever mechanically and to support it at any desired height, we contemplate using any of the well-known forms of adjusting-screws or equivalent devices at the free end of the lever, and we also contemplate using instead of the lever N an adjusting-screw or equivalent device mounted directly upon the center of the machine; but these contemplated devices are details which form no part of the invention herein claimed.

In Fig. 4 we have represented a modification of the regulating-valves as applied to lateral openings in the wall of the drum, substituted for the vertical openings in the top plate, as in Fig. 1, and in this case, the movement of the valve $k$ being horizontal, we support the opposite end of the valve-stem $k'$ in a flange or lug projecting from the extension $e$ of the coned hood E, the lug or flange being slotted, so as to admit of the necessary range of radial movement of the valve. This movement is secured through an inclined finger, $l$, depending from the grooved collar M, and sliding upon a reversed inclined surface on the end of the valve-stem $k'$. When the collar M is depressed, the finger $l$ will draw back the valve from its seat, and when the collar is raised the valve will be forced out (so as to close the opening) by the centrifugal force. The operation in all other respects is the same as hereinbefore described, and the regulation of this horizontal valve is effected by means of a lever, N, as above mentioned, its position being also susceptible of mechanical adjustment by the same means as contemplated in connection with the levers K K, Fig. 1.

In the operation of this regulated continuous process, whatever variation there may be in the speed of the rotations of the machine, and correspondingly in the escape of skimmed milk, there must at all times be a certain minimum discharge of the skimmed milk proportioned to the regulated feed-supply, and therefore it would suffice to provide for the regulation of the escape beyond this minimum quantity. We accordingly provide for this minimum escape one or more cocks, as shown in Fig. 5, this cock X being supported on the under side of the top plate D of the drum, and being extended downward and outward to near the wall of the drum, as shown. The top plate of the drum has an opening through it coinciding with the opening through the cock, and the skimmed milk escapes through this opening into the trough H, as already set forth. This escape may be adjusted by means of the plug or key of the cock X, such adjustment being of course made before the machine is started, and remaining fixed so long as the machine continues to rotate. With the minimum escape of skimmed milk provided for through one or more pairs of these cocks, we propose so regulate the excess of the escape above the minimum by means of one or more pairs of the valves $k$, as shown in Figs. 1 to 4.

It is to be observed that a perfect equipoise of the revolving drum must always be maintained, and to maintain such an equipoise the cocks and the valves must be so placed relatively to each other that one cock or valve will be counterbalanced by a corresponding cock or valve opposite to it.

Our description of the foregoing process and apparatus has been restricted to their use for creaming and skimming milk; but, as our improved adaptations of the apparatus are available for separating other fluids the constituents of which have, like those of fresh milk, different specific gravities, while we claim herein only the process of creaming and skimming milk mechanically, as described, we do not confine our claims on the apparatus to its use for creaming milk, but claim these improvements broadly, for whatever purpose they may be employed; and,

Having thus described the nature and objects of our invention, what we claim herein as new, and desire to secure by Letters Patent, is—

1. As an improvement in the process of creaming milk mechanically, driving off the cream mechanically, and removing the skimmed milk mechanically by centrifugal force, the hereinbefore-described method of regulating and adjusting the discharge of skimmed milk while the drum is rotating, substantially as and for the purposes described.

2. As an improvement in the process of creaming milk mechanically, driving off the cream mechanically, and removing the skimmed milk mechanically by centrifugal force, the hereinbefore-described method of supplementing the constant minimum discharge of skimmed milk by a variable discharge regulated while the drum is rotating, substantially as and for the purposes described.

3. The combination, in a centrifugal machine, of a revolving drum, vertical escape-openings therein, and cocks for regulating the escape through said openings, substantially as described.

4. The combination, in a centrifugal machine, of a revolving drum, vertical or lateral escape-openings therefrom, regulating-valves, and regulated cocks, substantially as and for the purposes set forth.

5. The combination, in a centrifugal machine, of a revolving drum, escape-openings therefrom, and regulated escape-cocks leading to said escape-openings, substantially as set forth.

WILHELM C. L. LEFELDT.
CARL G. O. LENTSCH.

Witnesses:
JOHS. KRACKE,
BRUNO GAEDE.